(12) United States Patent
Webb (10) Patent No.: US 10,640,164 B1
(45) Date of Patent: May 5, 2020

(54) GOOSENECK TRAILER

(71) Applicant: John Webb, Grand Island, NE (US)

(72) Inventor: John Webb, Grand Island, NE (US)

( * ) Notice: Subject to any disclaimer, the term of this patent is extended or adjusted under 35 U.S.C. 154(b) by 213 days.

(21) Appl. No.: 15/978,773

(22) Filed: May 14, 2018

(51) Int. Cl.
| | |
|---|---|
| B62D 63/08 | (2006.01) |
| B62D 21/02 | (2006.01) |
| B62D 53/08 | (2006.01) |
| B60P 3/06 | (2006.01) |
| B60P 1/56 | (2006.01) |
| B60P 1/43 | (2006.01) |
| F15B 15/14 | (2006.01) |

(52) U.S. Cl.
CPC ............... B62D 63/08 (2013.01); B60P 1/43 (2013.01); B60P 1/56 (2013.01); B60P 3/06 (2013.01); B62D 21/02 (2013.01); B62D 53/08 (2013.01); F15B 15/14 (2013.01)

(58) Field of Classification Search
CPC ........ B62D 63/06; B62D 63/08; B62D 21/02; B60P 1/43; B60P 1/56; B60P 3/06
See application file for complete search history.

(56) References Cited

U.S. PATENT DOCUMENTS 6,206,477 B1 * 3/2001 Rexus ..................... B65F 3/046
298/18
6,817,676 B2 * 11/2004 Anemone ............... B60P 1/165
298/18

* cited by examiner

*Primary Examiner* — Jacob D Knutson
*Assistant Examiner* — Harold Eric Pahlck, III
(74) *Attorney, Agent, or Firm* — Dennis L. Thomte; Thomte Patent Law Office LLC (57) ABSTRACT

A gooseneck trailer having an elevated hopper at the forward end thereof and a deck at the rearward end of the trailer for supporting a vehicle thereon. The hopper has a discharge opening formed in the lower end thereof at one side thereof and a discharge door, which is movable between open and closed positions, selectively closes the discharge opening. Locking devices are provided for locking the discharge door in its closed position.

5 Claims, 11 Drawing Sheets

GOOSENECK TRAILER

BACKGROUND OF THE INVENTION

Field of the Invention

This invention relates to a trailer. More particularly, this invention relates to a gooseneck trailer having an elevated hopper at the forward end of the trailer and a deck at the rearward end of the trailer for supporting a vehicle thereon.

Description of the Related Art

There are many trailers which have elevated hoppers. To the best of Applicant's knowledge, there has been no trailer with an elevated hopper which has a selectively closeably lower side discharge opening which extends for the entire length of the hopper. Further, to the best of Applicant's knowledge, there has been no trailer with an elevated hopper at its forward end and which has a deck rearwardly of the elevated hopper for supporting a vehicle thereon.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A gooseneck trailer is disclosed which includes an elongated and horizontally disposed main frame having a forward end, a rearward end, a first side and a second side. The main frame has decking material thereon. A first wheel assembly is provided at the first side of the main frame and a second wheel assembly is provided at the second side of the main frame. An inclined tail frame having a forward end, a rearward end, a first side and a second side extends rearwardly and downwardly from the rearward end of the main frame. A loading ramp is pivotally mounted at the rearward end of the tail frame and preferably includes first and second loading ramps which are pivotally movable between a stowed position and an extended position.

The trailer also includes an inclined frame having a forward end, a rearward end, a first side and a second side with the inclined frame extending upwardly and forwardly from the forward end of the main frame. A horizontally disposed hopper support frame having a rearward end, a forward end, a first side and a second side extends forwardly from the forward end of the inclined frame. A gooseneck hitch assembly extends downwardly and forwardly from the forward end of the hopper support frame for connection to a gooseneck hitch on a pickup truck or the like.

The trailer also includes a hopper having a rearward end, a forward end, a first side, a second side, an upper end and a lower end with the hopper being supported by the hopper support frame so as to extend downwardly therefrom. The hopper has a discharge opening at the lower end of the hopper at the second side thereof. A discharge door is pivotally mounted at the second side of the hopper which is movable between open and closed positions with respect to the discharge opening. A plurality of locking devices selectively lock the discharge door in the closed position.

It is therefore a principal object of the invention to provide an improved trailer which includes an elevated hopper at the forward end thereof and a deck at the rearward end thereof with the deck adapted to have a vehicle loaded thereon.

A further object of the invention is to provide a trailer having a hopper thereon which has a gravity assisted side discharge.

A further object of the invention is to provide a trailer having an elevated hopper which has a full length hopper door discharge.

A further object of the invention is to provide a trailer of the type described which has an elevated hopper which discharges material onto the driver's side of the trailer.

A further object of the invention is to provide a trailer which has I-beam structural design to strengthen the trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The trailer of this invention is referred to by the reference numeral 10 and which has a forward end 12, a rearward end 14, a right side 16 and a left side 18. Trailer 10 includes a first elongated and horizontally disposed right-side frame member 20 having a forward end 22, a rearward end 24, an upper end 26 and a lower end 28. Preferably, frame member 20 is of the I-beam type. Trailer 10 also includes an elongated and horizontally disposed left-side frame member 30 having a forward end 32, a rearward end 34, an upper end 36 and a lower end 38. Preferably, frame member 30 is of the I-beam type.

A pair of axles 40 and 42 are secured to frame members 20 and 30 and extend therebetween. The ends of the axles 40 and 42 are secured to frame members 20 and 30 by way of conventional suspension systems. A pair of wheels 44 and 46 are secured to the right ends of axles 40 and 42 respectively. A pair of wheels 48 and 50 are secured to the left ends of the axles 40 and 42 respectively.

A plurality of elongated and horizontally disposed cross-members (not shown) are secured to frame members 20 and 30 by welding and extend therebetween in a spaced-apart manner. The frame members 20 and 30 form a main frame which has decking material 51 thereon.

An elongated frame member 54 having a forward end 56 and a rearward end 58 has its forward end 56 secured to the rearward end 24 of frame member 20 by welding and extends rearwardly and downwardly therefrom. Frame member 54 has an upper end 57 and a lower end 59. Preferably, frame member 54 is of the I-beam type. An elongated frame member 60, having a forward end 62 and a rearward end 64, has its forward end 62 secured to the rearward end 34 of frame member 30 by welding and extends rearwardly and downwardly therefrom. A plurality of elongated and horizontally disposed cross-members 66 are secured to frame members 54 and 60 and extend therebetween in a spaced-apart manner. The frame members 54, 60 and cross-members 66 form a tail portion 67.

Figure 1:
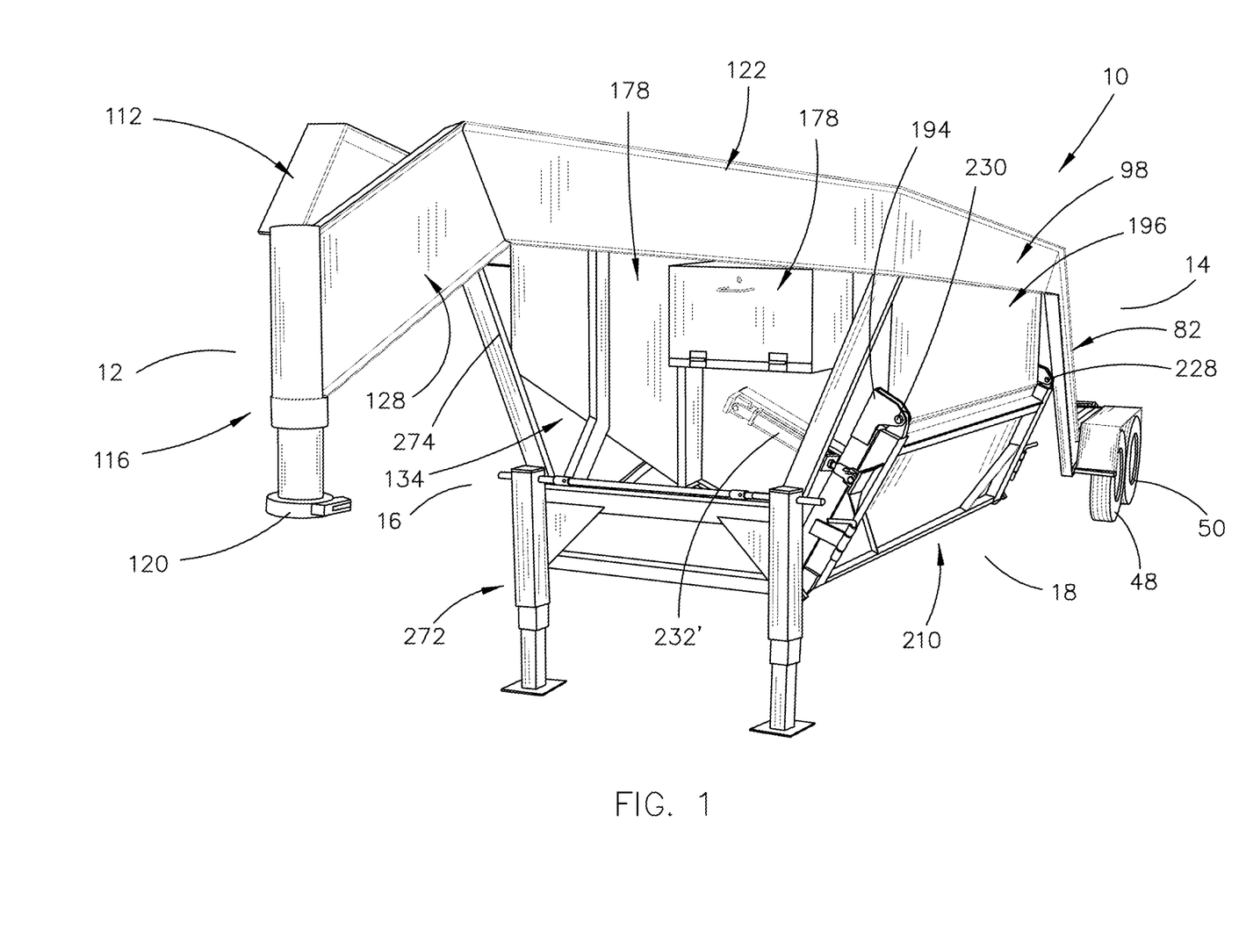
FIG. 1 is a front perspective view of the trailer of this invention.
Figure 2:
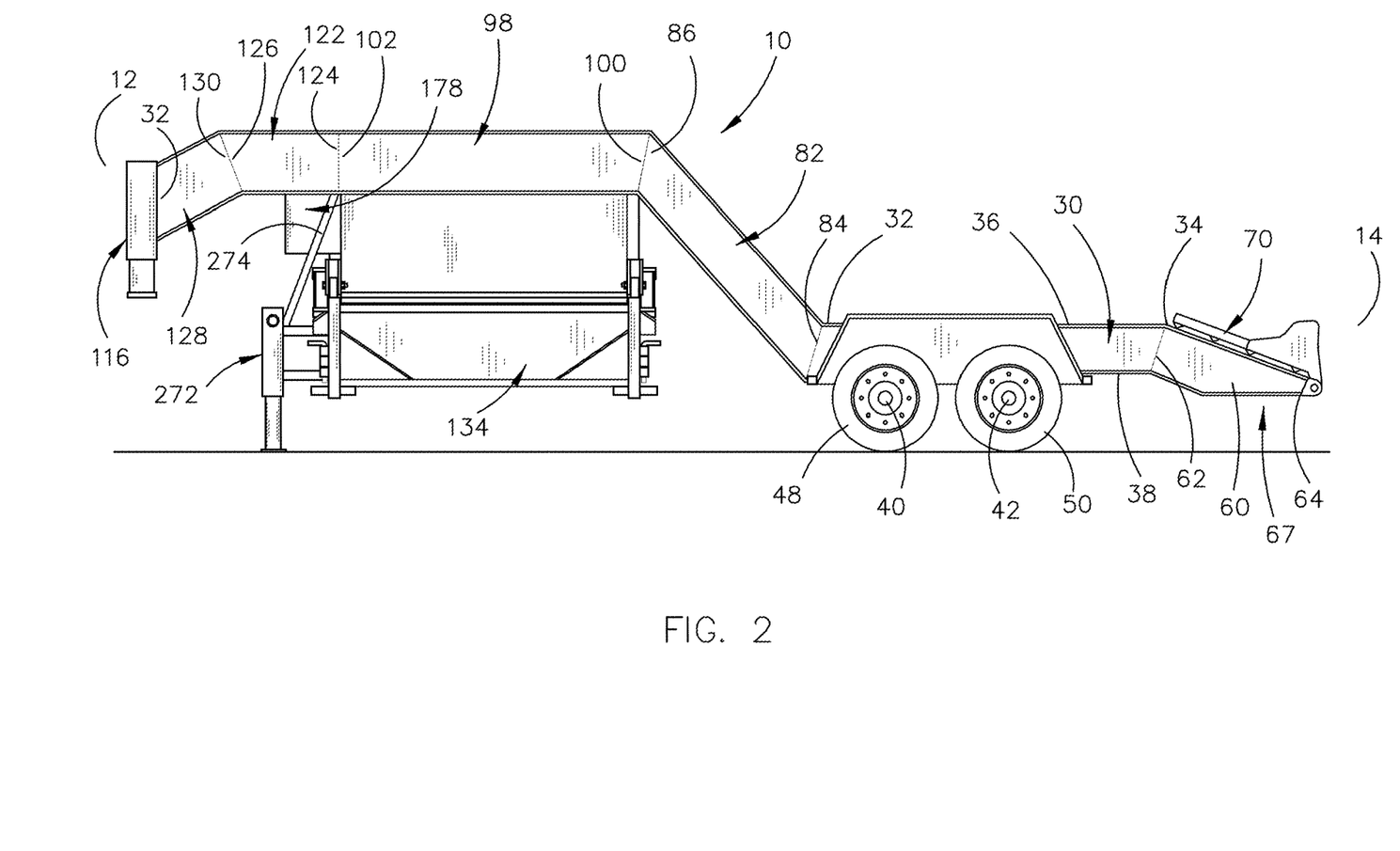
FIG. 2 is a left side view of the trailer of this invention.
Figure 2A:
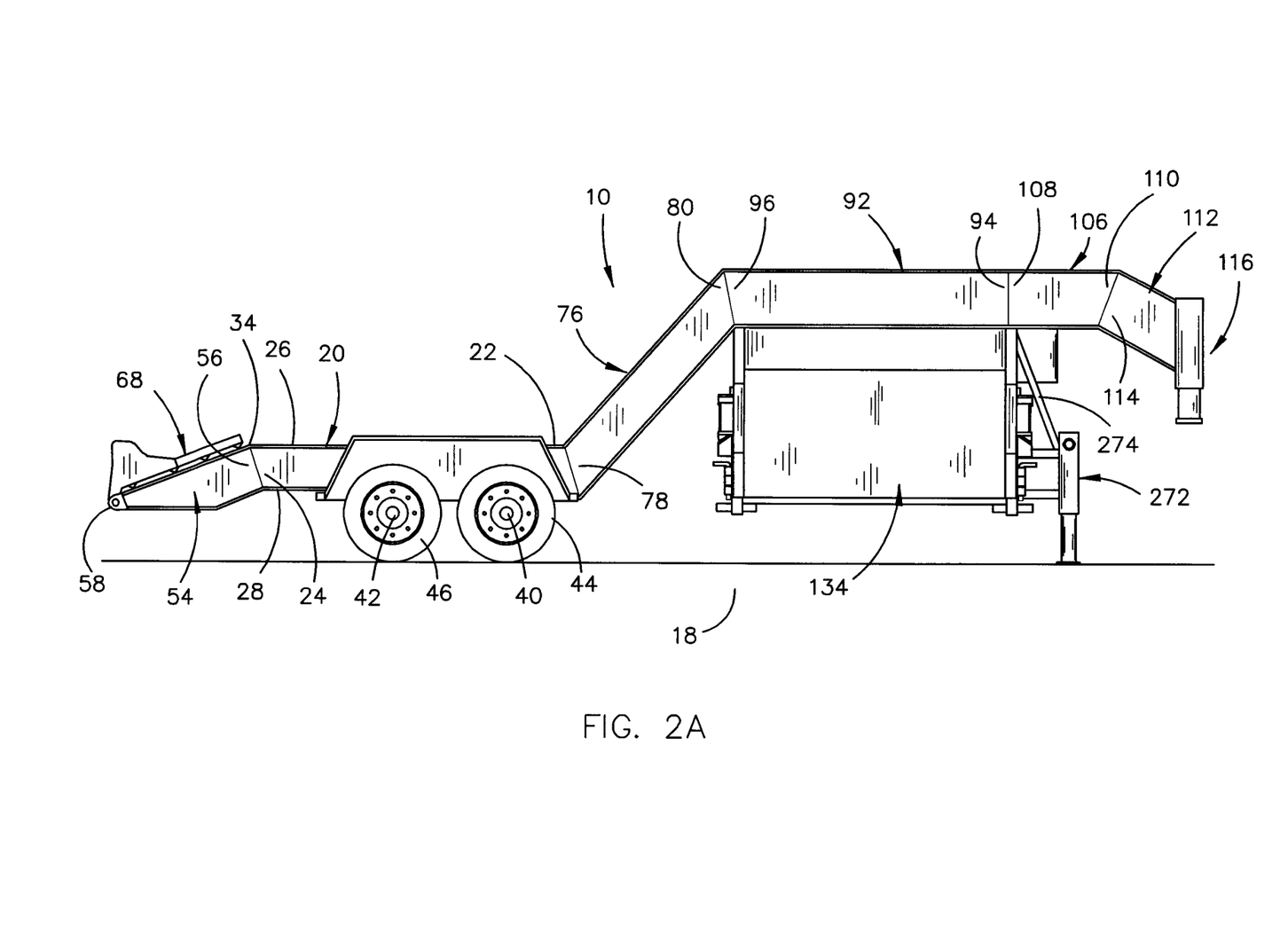
FIG. 2A is a right side view of the trailer of this invention.
Figure 3:
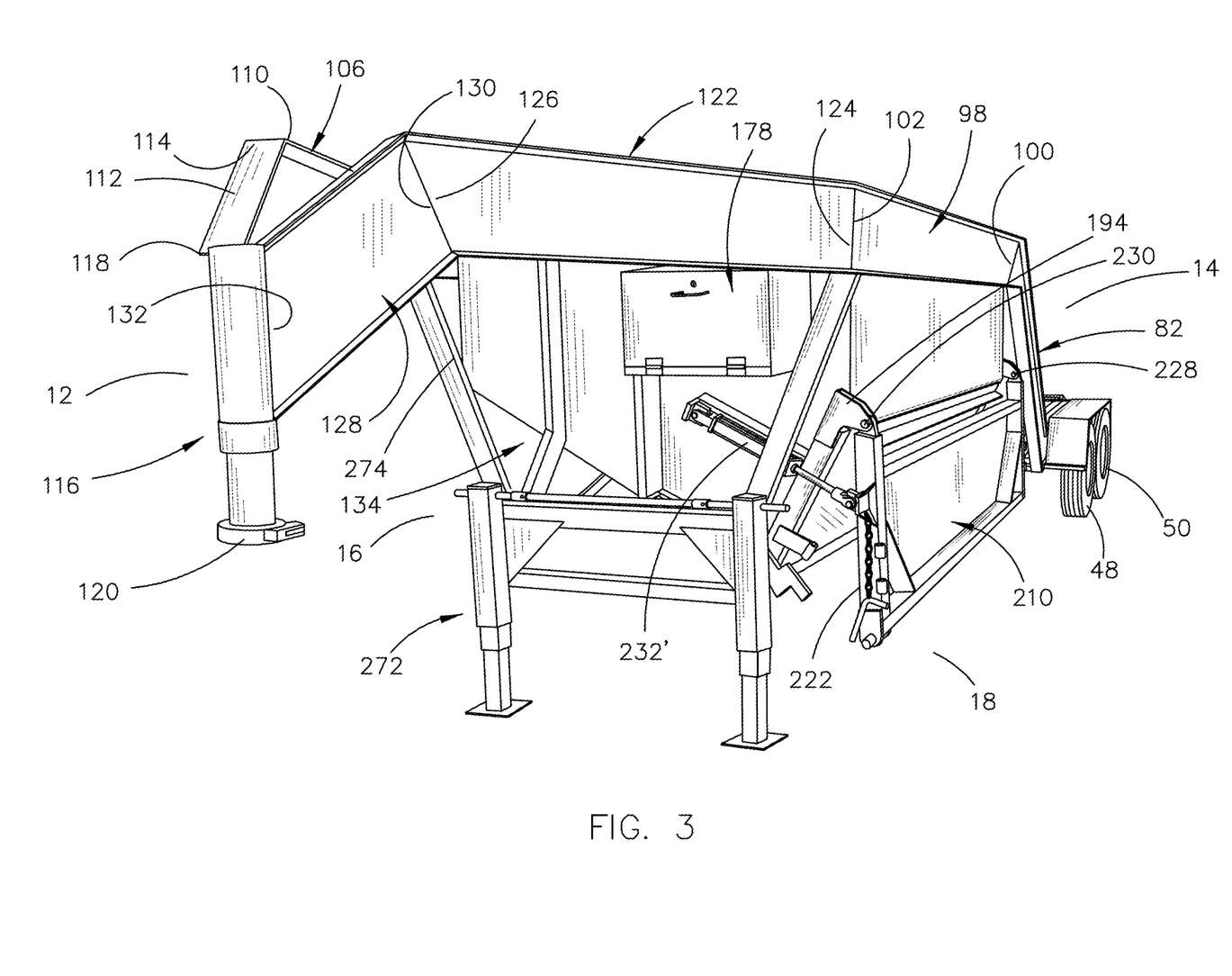
FIG. 3 is a front perspective view of the trailer of this invention with the discharge gate of the hopper in an open position.
Figure 4:
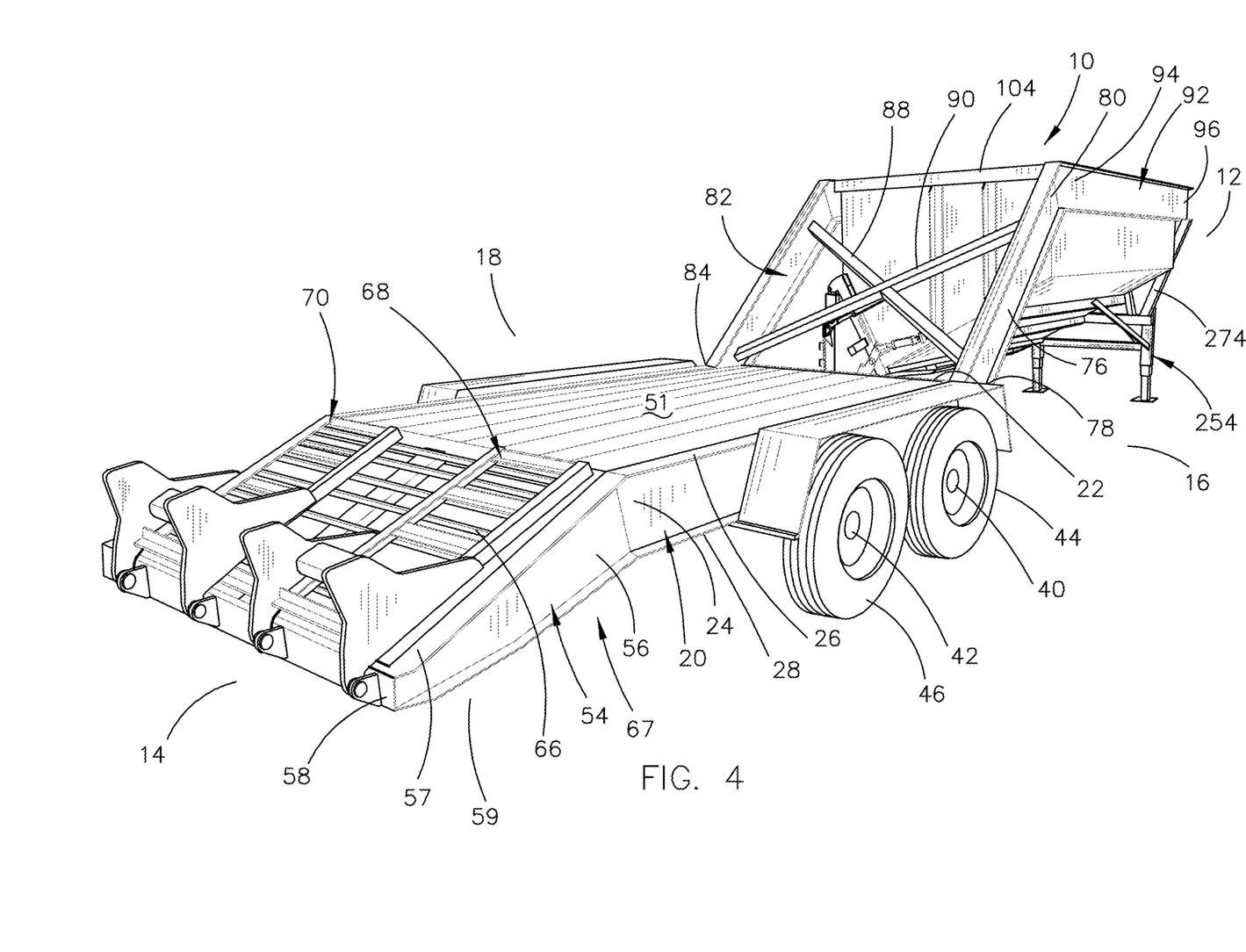
FIG. 4 is a rear perspective view of the trailer of this invention.

Foldable ramp members 68 and 70 are pivotally movably secured to the rearward ends of frame members 54 and 60 and are selectively pivotally movable between a folded or stored position of FIG. 4 to a conventional extended position.

An elongated frame member 76, having a rearward end 78 and a forward end 80, has its rearward end 78 secured to the forward end 22 of frame member 20 by welding and extends upwardly and forwardly therefrom. Preferably, frame member 76 is of I-beam type. An elongated frame member 82, having a rearward end 84 and a forward end 86, has its rearward end 84 secured to the forward end 32 of frame member 30 and extends upwardly and forwardly therefrom. Preferably, frame member 82 is of the I-beam type. Cross-braces 88 and 90 are secured to and extend between frame members 76 and 82.

An elongated and horizontally disposed frame member 92, having a rearward end 94 and a forward end 96, has its rearward end 94 secured to the forward end 80 of frame member 76 by welding or bolts and extends forwardly therefrom. Preferably, frame member 92 is of the I-beam type. An elongated and horizontally disposed frame member 98, having a rearward end 100 and a forward end 102, has its rearward end 100 secured to the forward end 86 of frame member 82 by welding or bolts and extends forwardly therefrom. An elongated and horizontally disposed frame member or brace 104 is secured to the forward ends of frame members 76 and 82 and extends therebetween.

The numeral 106 refers to an elongated frame member having a rearward end 108 and a forward end 110 which preferably is of the I-beam type. The rearward end 108 of frame member 106 is secured to the forward end 96 of frame member 92 by welding. Frame member 106 extends forwardly and inwardly from the forward end 96 of frame member 92. An elongated frame member 112 has its rearward end 114 secured to the forward end 110 of frame member 106 and extends forwardly and downwardly therefrom. Frame members 106 and 112 are preferably of the I-beam type. A frame member of brace 105 is secured to the forward end 96 of frame member 92 and the forward end 102 of frame member 98 and extends therebetween. A vertically disposed and conventional gooseneck hitch member 116 is secured to the forward end 118 of frame member 112 and has a hitch plate 120 at its lower end which is configured to be secured to a conventional gooseneck hitch located in the bed of a pick-up truck or the like.

The numeral 122 refers to an elongated frame having a rearward end 124 and a forward end 126 which preferably is of the I-beam type. The rearward end 124 of frame member 122 is welded to the forward end 102 of frame member 98 by welding. Frame member 122 extends forwardly and inwardly from the forward end 102 of frame member 98. An elongated frame member 128 has its rearward end 130 secured to the forward end 126 of frame member 122 and extends downwardly and forwardly therefrom. Frame member 128 is preferably of the I-beam type. The forward end 132 of frame member 128 is welded to the hitch member 116.

The numeral 134 refers to a cargo hold or hopper which is suspended between frame members 92, 98, 104 and 105. Hopper 134 includes an upstanding first side wall 136 having an upper end 138, with ends 140 and 142, a forward end 144, a rearward end 146 and a lower end 148. The numeral 150 refers to an inclined floor or bottom wall having an upper end 152, a lower end 154, a forward end 156 and a rearward end 158. The upper end 152 of floor 150 is secured to the lower end 148 of side wall 136.

Hopper 134 also includes a back wall 160 having an upper end 162, with ends 164 and 166, a first side 168, an inclined or angled lower end 170, a second side 172 with an inclined or angled side portion 174. A pivot plate 176 is secured to side 172 at the upper end of the inclined side portion 174.

Hopper 134 also includes a front wall 178 having an upper end 180, with ends 182 and 184, a first side 186, an inclined or angled lower end 188, a second side 190 with an inclined or angled side portion 192. A pivot plate 194 is secured to the second side 190 at the upper end of the inclined side portion 192. Hopper 134 also includes a second side 196 wall having an upper end 198, with ends 200 and 202, a forward end 204, a rearward end 206 and a lower end 208.

The numeral 210 refers to a hopper discharge door having an upper end 212, a lower end 214, a rearward end 216 having a pivot plate 218 at its upper end, a rearwardly extending shaft or pin 220 at its lower end, a forward end 222 having a pivot plate 224 at its upper end and a forwardly extending shaft or pin 226 at its lower end. Pivot plate 218 is pivotally secured to pivot plate 176 of back wall 160 by a pin 228. Pivot plate 224 is pivotally secured to pivot plate 194 of front wall 178 by a pin 230.

Figure 5:
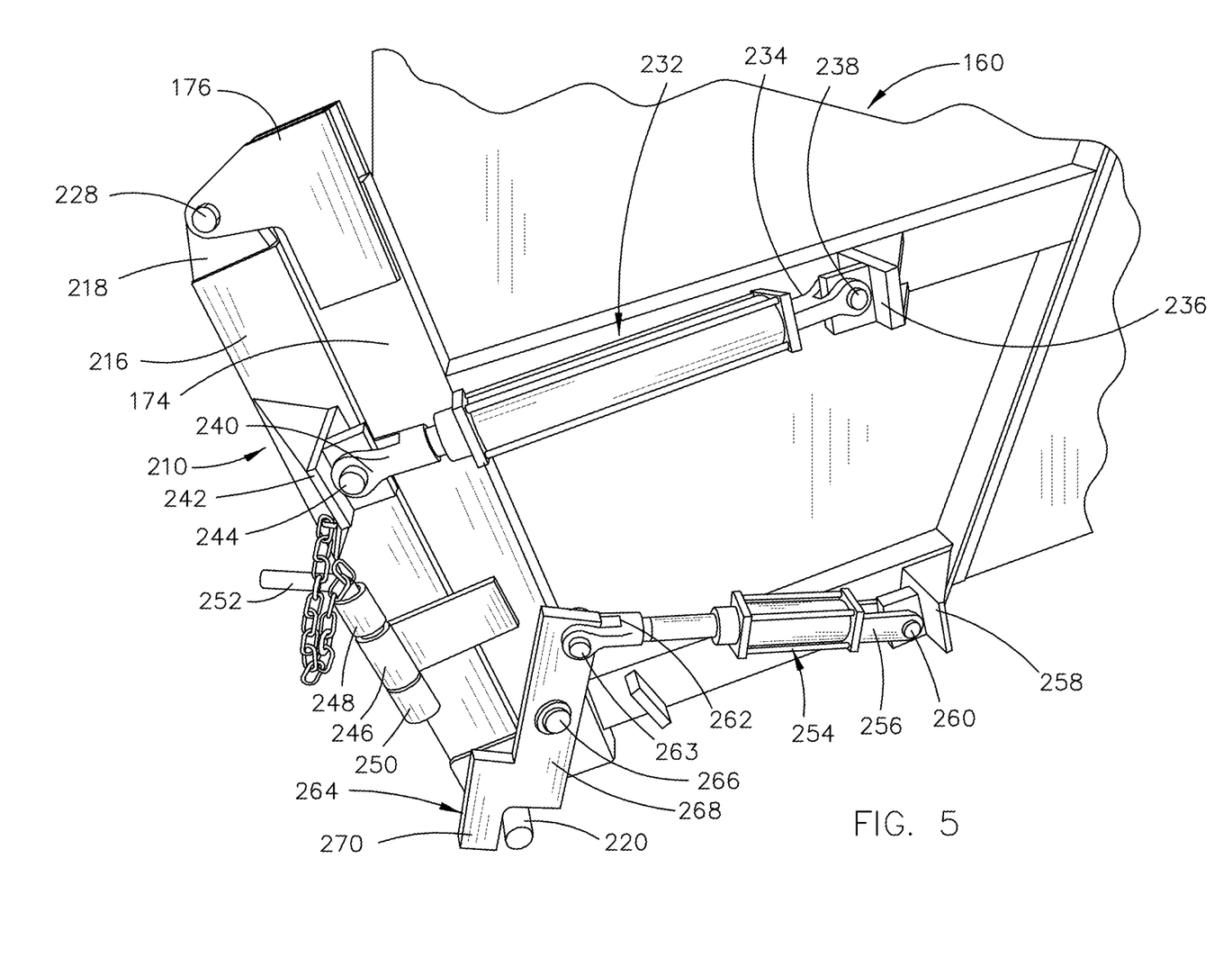
FIG. 5 is a partial perspective view of the dual locking systems for preventing the hopper gate from accidently opening.

An elongated double-acting hydraulic cylinder 232 has its base end 234 pivotally secured to bracket 236, which is secured to the back wall 160, by pin 238. The rod end 240 of hydraulic cylinder 232 is pivotally connected to bracket 242, which is secured to end 216 of door 210, by a pivot pin 244. A collar 246 is secured to end 174 of back wall 160 as seen in FIG. 5. A pair of spaced-apart collars 248 and 250 are secured to end 216 of door 210 as also seen in FIG. 5. When door 210 is closed, the collars 248 and 250 receive collar 246 therebetween. A lock pin 252 is removably extended downwardly through collars 248, 246 and 250 to maintain or lock door 210 in its closed position.

Figure 6:
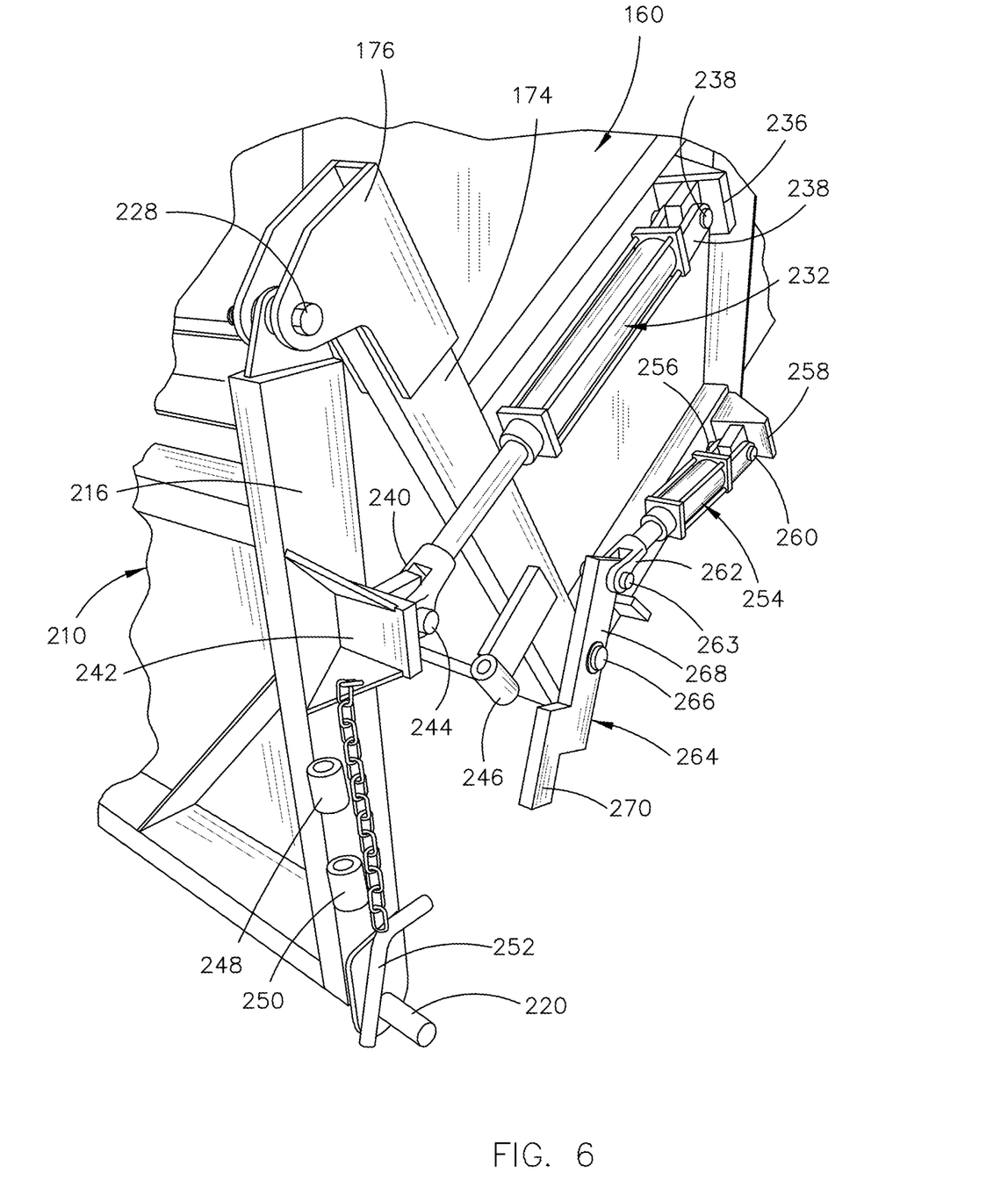
FIG. 6 is a partial perspective view of the dual locking systems in an unlocked position so that the hopper gate may be opened.
Figure 7:
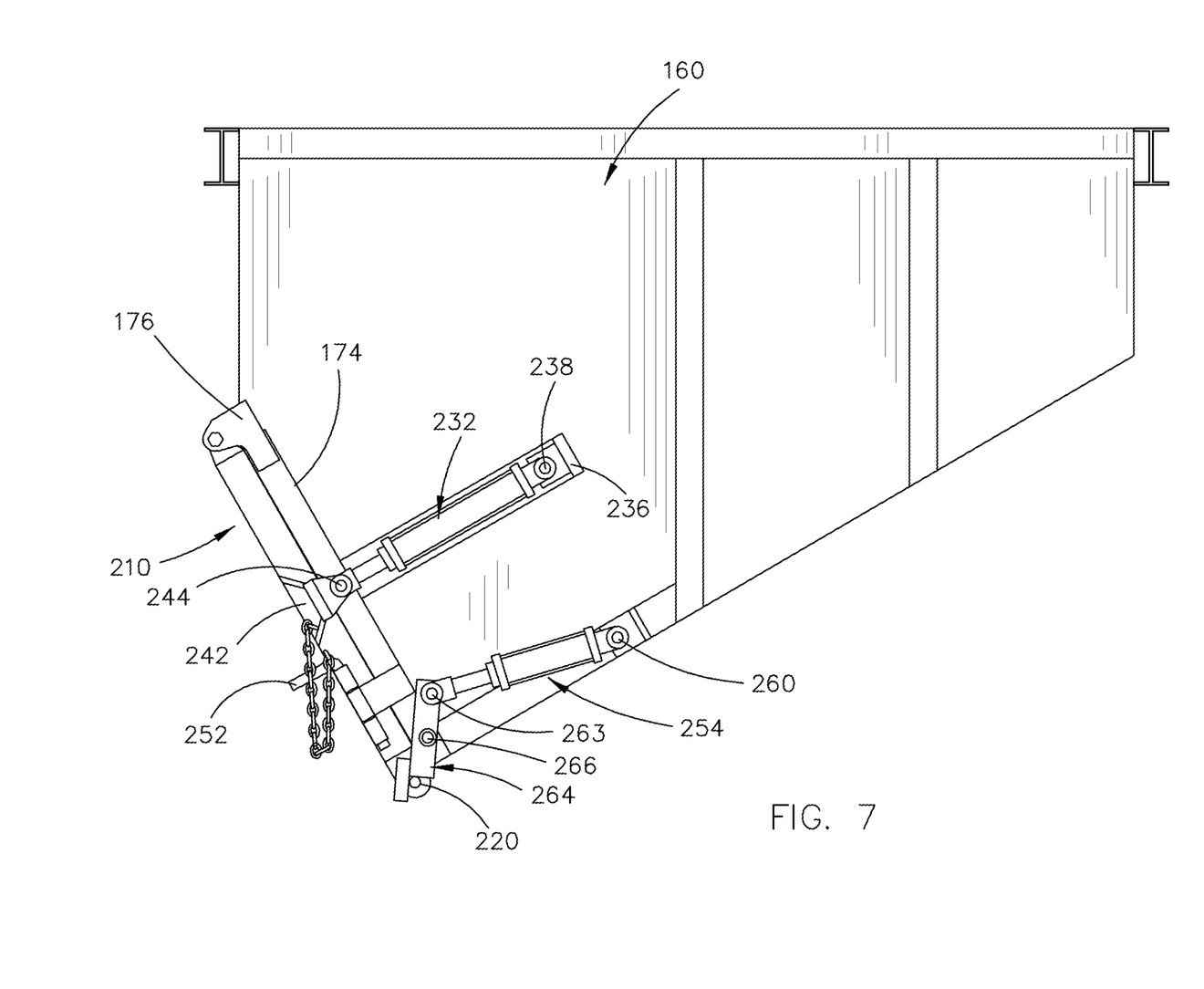
FIG. 7 is a left side view of the trailer hopper with the discharge gate thereof being in a closed locked position.
Figure 8:
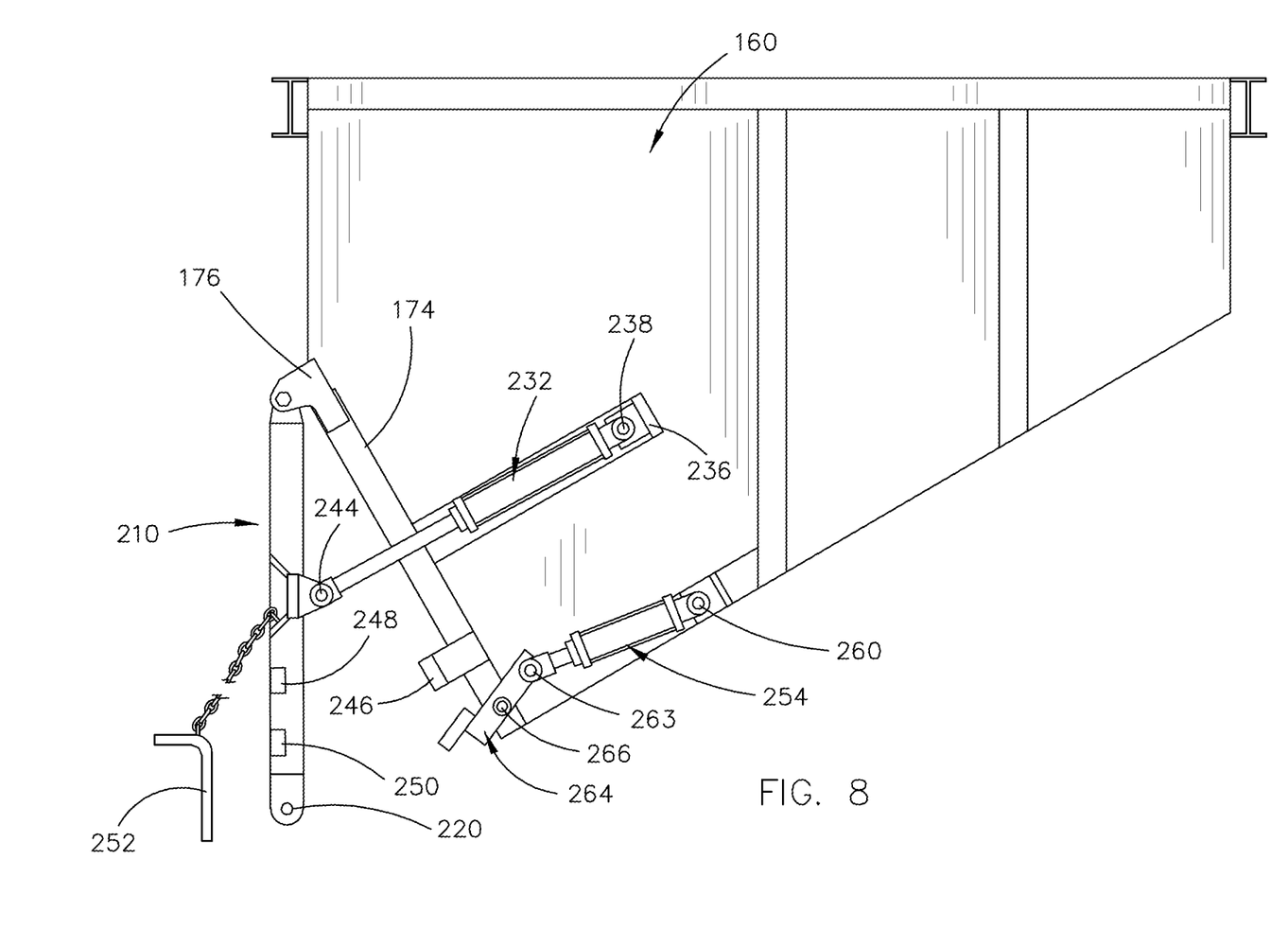
FIG. 8 is a rear view of the trailer hopper with the discharge gate thereof being in an open position.

The numeral 254 refers to a double-acting hydraulic cylinder which has its base end 256 pivotally secured to bracket 258, which is secured to back wall 160, by a pin 260. The rod end 262 of cylinder 254 is pivotally secured by pin 263 to locking bar 264 which is pivotally secured to end 174 of back wall 160 by a pin 266. Locking bar 264 includes an elongated bar portion 268 and an offset bar portion 270. When door 210 is closed, the hydraulic cylinder 254 is extended which causes the locking bar 264 to pivot to the position of FIG. 5 whereby the offset bar portion 270 is positioned outwardly of shaft 220 of door 210 to positively maintain or lock door 210 in its closed position. FIG. 6 illustrates the hydraulic cylinder 232 in its extended position which is made possible by retracting hydraulic cylinder 254 thereby pivoting locking bar 264 away from pin 220.

The above explanation describes the pivoting and locking devices which are located at the rearward end of the door 210 and the rearward left side of the hopper 134. Identical pivoting and locking devices are provided at the forward end of door 210 and the forward left side of the hopper 134. The pivoting and locking devices at the forward end of the door 210 will be designated with a "'".

The numeral 272 refers to a tandem landing gear assembly of conventional design which is secured to the trailer by braces 274. The landing gear assembly 272 adjustably supports the forward end of the trailer 10 when the trailer is disconnected from the towing vehicle.

The numeral 276 refers to a secure box which is mounted on the front side of front wall 178. The hydraulic power unit for the hydraulic cylinders 232, 254, 232' and 254' and valving therefore is located in box 276 with the same being connected to the tow vehicle battery in conventional fashion.

Figure 9:
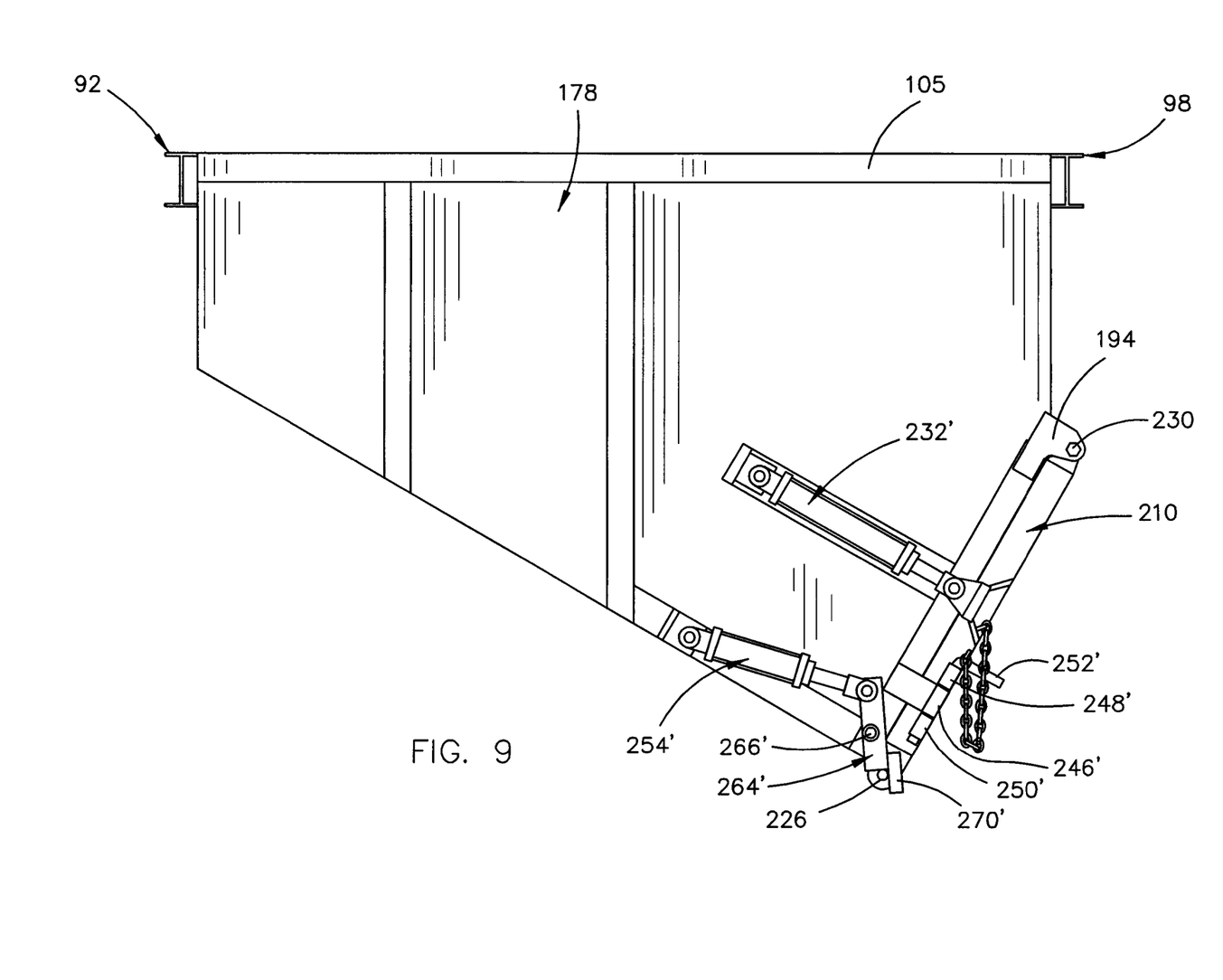
FIG. 9 is a front view of the trailer hopper with the discharge gate being in the closed and locked position.
Figure 10:
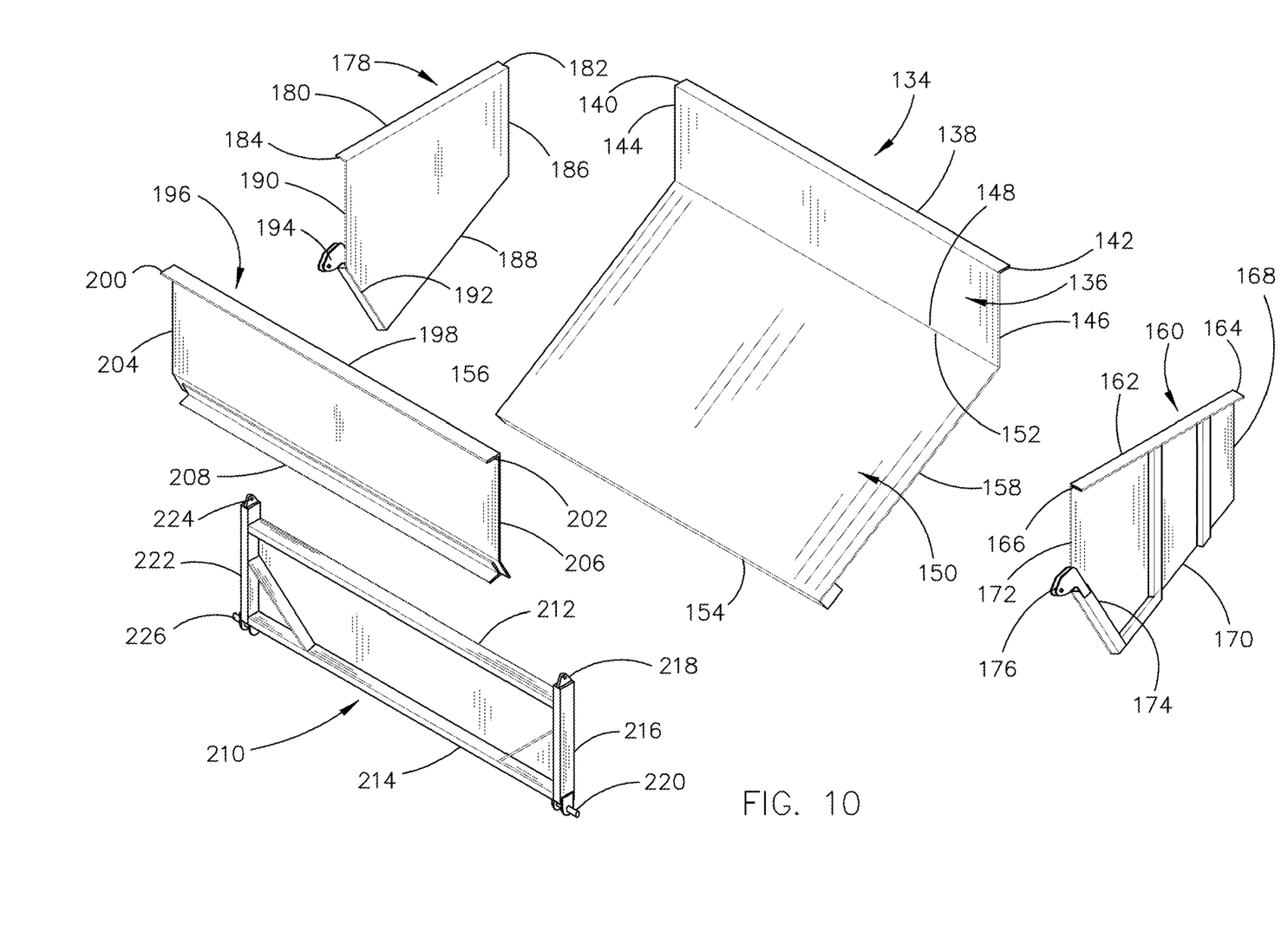
FIG. 10 is an exploded perspective view of the trailer hopper of this invention.

The functioning of the trailer 10 will now be described. The door 210 will be initially closed by retracting the hydraulic cylinders 232 and 232'. During the closing of door 210, the hydraulic cylinders 254 and 254' will be in their retracted positions. When the door 210 is closed, the locking of the same will be performed. The locking pin 252 will be extended downwardly through the collars 248, 246 and 250. The hydraulic cylinder 254 is then extended so that the locking bar 264 will be pivoted to the position of FIG. 5 so that the lower offset portion 270 thereof will be positioned outwardly of pin 220. The same procedure will be performed at the forward end of door 210. The locking pin 252' will be extended downwardly through the collars 248', 246', and 250'. The hydraulic cylinder 254' is then extended so that the locking bar 264' will be pivoted to the position of FIG. 9 so that the lower offset portion 270' of locking bar 264' is positioned outwardly of the pin 266. Thus, the door 210 is positively and safely locked in its closed position to prevent the contents of the hopper 134 from being inadvertently discharged from the hopper.

The hopper 134 will then be filled with material. The loading ramp members 68 and 70 will then be pivotally moved to their extended position. A skid-steer vehicle or other vehicle may be driven upwardly and forwardly over ramp members 68 and 70, up the tail portion 67 and onto the deck 72 of trailer 10. The loading ramp members 68 and 70 will then be pivotally moved to their stowed positions.

The trailer 10 will then be towed to its desired location. The hydraulic cylinders 254 and 254' will then be extended to move the offset portion 270 away from pin 220 and to move the offset portion 270' away from pin 266. The hydraulic cylinders 232 and 232' will then be extended to open door 210 to permit the material within hopper 134 to be discharged from the left side thereof and the left side of the trailer.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A gooseneck trailer, comprising:
an elongated and horizontally disposed main frame having a forward end, a rearward end, a first side and a second side;
a deck on said main frame;
said deck configured to have a vehicle positioned thereon;
a first wheel assembly at said first side of said main frame;
a second wheel assembly at said second side of said main frame;
a tail frame having a forward end, a rearward end, a first side and a second side;
said tail frame extending rearwardly and downwardly from said rearward end of said main frame;
a vehicle loading ramp assembly having a forward end, a rearward end, a first side and a second side;
said forward end of said vehicle loading ramp assembly being pivotally secured to said rearward end of said tail frame;
said vehicle loading ramp assembly being selectively pivotally movable between a stowed position and a loading position;
an inclined frame having a forward end, a rearward end, a first side and a second side;
said inclined frame extending upwardly and forwardly from said forward end of said main frame;
a horizontally disposed hopper support frame having a forward end, a rearward end, a first side and a second side;
said hopper support frame extending forwardly from said forward end of said inclined frame;
a gooseneck hitch frame having a forward end, a rearward end, a first side and a second side;
said gooseneck hitch frame extending forwardly and downwardly from said forward end of said hopper support frame;
a gooseneck hitch secured to said forward end of said gooseneck frame;
a hopper having:
 (a) a first side wall with a forward end, a rearward end, an upper end and a lower end;
 (b) a second side wall with a forward end, a rearward end, an upper end and a lower end;
 (c) an upstanding back wall having an upper end with first and second ends, a first side, having upper and lower ends, extending downwardly from said first end thereof, a second side, having upper and lower ends, extending downwardly from said second end thereof with said second side including an inclined portion, having upper and lower ends, at said lower end thereof an angled lower end, having first and second ends, which extends downwardly and laterally from said first side thereof to said lower end of said inclined portion of said second side;
 (d) said second side of said back wall having a first pivot plate extending therefrom at said upper end of said inclined portion;

(e) an upstanding front wall having an upper end with first and second ends, a first side, having upper and lower ends, extending downwardly from said first end of said upper end, a second side, having upper and lower ends, extending downwardly from said second end of said upper end with said second side end of said upper end with said second side including an inclined position at said lower end thereof, and an angled lower end, having first and second ends, which extends downwardly and laterally from said lower end of said first side thereof to said lower end of said inclined portion of said second side;

(f) said second side of said front wall having a second pivot plate extending therefrom at said upper end of said inclined portion of said second side of said front wall;

(g) and an inclined floor having a forward end, a rearward end, an upper end and a lower end, which extends downwardly and laterally from said lower end of said first side wall;

(h) said lower end of said back wall being secured to said rearward end of said inclined floor;

(i) said lower end of said front wall being secured to said forward end of said inclined floor;

(j) said lower end of said inclined floor being spaced inwardly and below said lower end of said second side wall to create a discharge opening at one side of said hopper;

an elongated and rectangular discharge door having a forward end, a rearward end, an upper end and a lower end;

said upper end of said discharge door being pivotally secured to said first and second pivot plate so as to be pivotally movable between open and closed positions;

said discharge door, when in said closed position, closing said discharge opening;

said discharge door, when in said open position, permitting material in said hopper to pass outwardly and downwardly through said discharge opening to one side of the trailer;

a first hydraulic cylinder pivotally secured to and extending between said back wall and said discharge door at said rearward end thereof;

a second hydraulic cylinder pivotally secured to and extending between said front wall and said discharge door at said forward end thereof; and locking devices at said rearward and forward ends of said discharge door which are configured to lock said discharge door in said closed position.

2. The gooseneck trailer of claim 1 wherein two different locking devices are positioned at each of said rearward and forward ends of said discharge door.

3. The gooseneck trailer of claim 2 wherein one of said locking devices at each of said rearward and forward ends of said discharge door includes:

(a) a double-acting hydraulic cylinder having a base end and a rod end;

(b) said base end of said double-acting hydraulic cylinder being secured to the associated back wall or front wall;

(c) said rod of said double-acting hydraulic cylinder being pivotally secured to a pivotal locking bar which is pivotally movable between a locked position and an unlocked position; and (d) said locking bar, when in said locked position, prevents said discharge door from moving from said closed position to said open position.

4. A gooseneck trailer, comprising:

a main frame having a forward end, a rearward end, a first side and a second side;

a tail frame, having a forward end, a rearward end, a first side and a second side;

said tail frame extending rearwardly and downwardly from said rearward end of said main frame;

a loading ramp at said rearward end of said tail frame;

said main frame having a deck thereon to enable a vehicle to be positioned thereon;

an elevated hopper support positioned forwardly of and above said main frame;

a hopper having an upper end, a lower end, a forward end, a rearward end, a first side and a second side;

said upper end of said hopper being secured to said hopper support frame whereby said hopper extends downwardly therefrom;

said lower end of said hopper having a discharge opening formed therein at said second side thereof whereby material in said hopper may be discharged therefrom at the side of the trailer; and a discharge door mounted on said hopper for selectively closing said discharge opening.

5. The gooseneck trailer of claim 4 further including a locking device for maintaining said discharge door in a closed position.

* * * * *